US008221209B2

(12) United States Patent
Herrmann et al.

(10) Patent No.: US 8,221,209 B2

(45) **Date of Patent: *Jul. 17, 2012**

(54) GAME OF CHANCE AND SYSTEM AND METHOD FOR PLAYING GAMES OF CHANCE

(75) Inventors: Mark E. Herrmann, Boston, MA (US); Steven N. Kane, Boston, MA (US); Stuart Roseman, Boston, MA (US); Jason Yanowitz, Cambridge, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 34 days.

This patent is subject to a terminal disclaimer.

(21) Appl. No.: 12/642,955

(22) Filed: Dec. 21, 2009

(65) Prior Publication Data

US 2010/0240431 A1 Sep. 23, 2010

Related U.S. Application Data

(63) Continuation of application No. 10/768,980, filed on Jan. 30, 2004, now Pat. No. 7,727,062.

(60) Provisional application No. 60/444,474, filed on Feb. 3, 2003.

(51) Int. Cl.
*A63F 13/00* (2006.01)
*A63F 1/18* (2006.01)

(52) U.S. Cl. ................ 463/16; 463/12; 463/13; 463/20; 463/22; 273/138.1; 273/139; 273/292

(58) Field of Classification Search .............. 463/10–13, 463/16–22, 25–29, 40–42; 273/138.1, 139, 273/142 B, 142 A, 142 J, 148 A, 148 R, 148 B, 273/149 P, 149 R, 274, 292–293, 304, 306, 292/309; *A63F 13/00, 1/18*
See application file for complete search history.

(56) References Cited

U.S. PATENT DOCUMENTS

| | | | | |
|---|---|---|---|---|
| 4,467,424 | A | | 8/1984 | Hedges |
| 4,662,635 | A | | 5/1987 | Enokian |
| 4,926,327 | A | | 5/1990 | Sidley |
| 5,033,744 | A | | 7/1991 | Bridgeman |
| 5,042,809 | A | | 8/1991 | Richardson |
| 5,042,818 | A | | 8/1991 | Weingardt |
| 5,083,800 | A | | 1/1992 | Lockton |
| 5,110,129 | A | | 5/1992 | Alvarez |
| 5,116,049 | A | | 5/1992 | Sludikoff |
| 5,308,065 | A | * | 5/1994 | Bridgeman et al. ............ 463/13 |
| 5,324,035 | A | | 6/1994 | Morris |
| 5,342,049 | A | * | 8/1994 | Wichinsky et al. ....... 273/119 R |
| 5,411,257 | A | | 5/1995 | Fulton |
| 5,411,268 | A | * | 5/1995 | Nelson et al. ................. 273/292 |
| 5,580,310 | A | | 12/1996 | Orus |

(Continued)

FOREIGN PATENT DOCUMENTS

EP 0981118 A 2/2000

(Continued)

*Primary Examiner* — Arthur O. Hall
(74) *Attorney, Agent, or Firm* — Dority & Manning, P.A.

(57) ABSTRACT

A game of chance is provided in which a wagering game of skill and chance is played electronically automatically according to a predetermined set of rules. Such games of chance may include card games, such as poker and blackjack, or other games, such as dominoes, craps or backgammon. Such games may be reduced to games of chance, removing the element of player skill, and allowing such games to be played outside legal gaming jurisdictions.

18 Claims, 8 Drawing Sheets

U.S. PATENT DOCUMENTS

| | | | | |
|---|---|---|---|---|
| 5,586,937 | A | 12/1996 | Menashe | |
| 5,700,008 | A | 12/1997 | Lawlor | |
| 5,722,890 | A | 3/1998 | Libby | |
| 5,762,552 | A | 6/1998 | Vuonge | |
| 5,766,076 | A | 6/1998 | Pease | |
| 5,772,509 | A | 6/1998 | Weiss | |
| 5,816,919 | A | 10/1998 | Scagnelli | |
| 5,827,119 | A * | 10/1998 | Bromley | 463/7 |
| 5,830,067 | A | 11/1998 | Graves | |
| 5,833,536 | A | 11/1998 | Davids | |
| 5,851,149 | A | 12/1998 | Xidos | |
| 5,954,582 | A | 9/1999 | Zach | |
| 5,961,119 | A * | 10/1999 | Brown | 273/292 |
| 5,971,849 | A | 10/1999 | Falciglia | |
| 5,984,779 | A | 11/1999 | Bridgeman | |
| 6,146,272 | A | 11/2000 | Walker | |
| 6,183,361 | B1 | 2/2001 | Cummings | |
| 6,227,969 | B1 | 5/2001 | Yoseloff | |
| 6,254,479 | B1 * | 7/2001 | Okitani et al. | 463/7 |
| 6,257,979 | B1 | 7/2001 | Walker | |
| 6,267,669 | B1 | 7/2001 | Luciano | |
| 6,299,170 | B1 | 10/2001 | Yoseloff | |
| 6,309,299 | B1 | 10/2001 | Weiss | |
| 6,315,665 | B1 * | 11/2001 | Faith | 463/23 |
| 6,322,078 | B1 | 11/2001 | Adams | |
| 6,508,709 | B1 | 1/2003 | Karmarkar | |
| 6,616,531 | B1 | 9/2003 | Mullins | |
| 6,729,959 | B1 | 5/2004 | Moore | |
| 6,960,134 | B2 | 11/2005 | Hartl | |
| 6,969,320 | B2 | 11/2005 | Lind | |
| 7,128,645 | B1 | 10/2006 | White | |
| 7,179,166 | B1 * | 2/2007 | Abbott | 463/9 |
| 7,192,352 | B2 | 3/2007 | Walker | |
| 7,294,058 | B1 | 11/2007 | Slomiany | |
| 7,485,043 | B2 | 2/2009 | Beaulieu | |
| 2001/0000778 | A1 | 5/2001 | Sines | |
| 2002/0010013 | A1 | 1/2002 | Walker | |
| 2002/0077165 | A1 | 6/2002 | Bansemer | |
| 2003/0032476 | A1 | 2/2003 | Walker | |
| 2003/0232638 | A1 | 12/2003 | Luciano | |
| 2007/0178969 | A1 * | 8/2007 | Luciano et al. | 463/42 |

FOREIGN PATENT DOCUMENTS

GB 2072395 A * 9/1981

* cited by examiner

GAME OF CHANCE AND SYSTEM AND METHOD FOR PLAYING GAMES OF CHANCE

RELATED APPLICATIONS

This application is a continuation of and claims priority under 35 U.S.C §120 to U.S. application Ser. No. 10/768,980, filed Jan. 30, 2004, entitled "GAME OF CHANCE AND SYSTEM AND METHOD FOR PLAYING GAMES OF CHANCE," which claims priority under 35 U.S.C. §119(e) to U.S. Provisional Application Ser. No. 60/444,474, entitled "GAME OF CHANCE AND SYSTEM AND METHOD FOR PLAYING GAMES OF CHANCE," filed on Feb. 3, 2003, which applications are herein incorporated by reference in their entirety.

FIELD OF THE INVENTION

The present invention relates to games of chance and, more particularly, to methods of and systems for playing games of chance.

DESCRIPTION OF THE RELATED ART

Numerous games are played legally as wagering games at casinos and other locales in the United States and around the world. The more popular wagering games include card games, tile games and other types of games. More popular wagering card games include poker, and blackjack (or twenty-one) and baccarat. Other wagering card games include, for instance, cribbage, hearts, spades, euchre, canasta and bridge. Wagering tiles games include the many variations of dominoes and Asian tile games, including Tien Gow and Tiu U, and a more complete list of tile games may be found at www.dominoes.com. Other wagering games include craps and backgammon. Each of the games mentioned are games of skill and chance, except baccarat. That is, each game has an element of chance due to the randomness of the card order, but skill or knowledge can be used to increase, sometimes dramatically, the odds that a player may win.

The popular wagering card game of blackjack is discussed below as an illustrative example of how a player may improve the chances of winning with some knowledge. In blackjack, a player plays against the dealer to obtain a score as close as possible to twenty-one. In blackjack, face cards are worth ten, aces are worth either one or eleven and others are face value. Players each play their own hands.

The players and the dealer are initially dealt two cards each. In turn, each player decides whether to take more cards or not depending upon what cards the player holds and the one card shown in the dealer's hand. A player may take as many cards as is necessary, but if the player goes over twenty-one, the player automatically loses. The dealer follows the players in taking additional cards but can take additional cards only according to predetermined rules. In some blackjack games, the dealer must always take a card unless he or she has seventeen or more points (hard 17). In another common variation of blackjack, the dealer must take a card unless he or she has seventeen or more points except when seventeen is obtained by an ace being counted as eleven (soft 17).

A player has numerous options for playing a hand. Depending upon the rules of the gaming operator, the player can double, surrender, pay insurance, split, hit or stick. When a player doubles the initial bet is doubled by the player, and the player takes only one more card. When a player surrenders, the player quits the hand and receives back half the initial bet. If a player elects to pay insurance, the player pays up to an additional fifty percent of the initial bet to protect against a dealer blackjack when the dealer shows an ace. If the dealer has blackjack, the player breaks even and if the dealer does not have blackjack, the player loses the insurance bet and plays the hand. If a player has two same value cards, i.e., two eights, then the player may "split" the hand into two hands and place the equivalent of another initial bet on the new second hand; the player then plays the two hands separately. The term "hit" means a player takes another card and the term "stick" means the player stops taking cards.

Using these options, a player can play and still have poor odds of winning against the gaming operator. However, it is possible to increase a player's odds of winning by following a set playing strategy. For a blackjack game having the playing criteria of two decks, hard 17, doubling any two cards, doubling after splitting and no surrender, a player can reduce the gaming operator advantage to 0.20% by following set rules for splitting, doubling, hitting and sticking.

An example strategy table for playing the described game of blackjack is shown in Table 1 below.

TABLE 1

| Player Hard Total Game Strategy | | | | | | | | | | |
|---|---|---|---|---|---|---|---|---|---|---|
| | Dealer Upcard | | | | | | | | | |
| Player Total | 2 | 3 | 4 | 5 | 6 | 7 | 8 | 9 | T | A |
| 17 and above | S | S | S | S | S | S | S | S | S | S |
| 16 | S | S | S | S | S | H | H | H | H | H |
| 15 | S | S | S | S | S | H | H | H | H | H |
| 14 | S | S | S | S | S | H | H | H | H | H |
| 13 | S | S | S | S | S | H | H | H | H | H |
| 12 | H | H | S | S | S | H | H | H | H | H |
| 11 | D | D | D | D | D | D | D | D | D | D |
| 10 | D | D | D | D | D | D | D | D | H | H |
| 9 | D | D | D | D | D | H | H | H | H | H |
| 8 and below | H | H | H | H | H | H | H | H | H | H |

Key:
H = Hit;
S = Stand;
D = Double

Table I applies when a player has the indicated hard totals, i.e., no ace worth eleven. Two other tables for soft totals and for doubling complete the strategy set for the described example blackjack game. For instance, the website www-.blackjackinfo.com generates strategy to tables for playing different variations of blackjack. A player can increase the odds of winning even more by additionally being able to remember what cards have been played from the deck (commonly known as card counting).

For the wagering games mentioned above and others, there are often numerous variations that can be played but in all cases, there is an ideal strategy to play for increasing the odds of winning as much as possible for the player(s). The best player strategy can often be found in books, on the Internet and in other resources. Also, some games (e.g., computer-based games) provide extensive hints as to how best to play a hand. However, the rules to follow for best play are often complicated and thus a casual player greatly increases the odds that the dealer, other players, or the gaming operator wins because of poor gaming skills of the player.

Baccarat is the one wagering game that is a game of chance. In the most common versions of baccarat, Punto Banco and Chemin de Fer, two cards each are dealt to a player and the dealer. The player plays against the dealer trying to obtain as close to nine points as possible. If either the player or the dealer has eight or nine points in the initial deal, then the game is over. If the player or dealer achieves a nine in the initial deal, the player or dealer automatically wins unless tied by another nine achieved by another. If there is no nine, an eight in the initial deal automatically wins unless tied by another eight. Face cards are worth zero points, aces are one point and other cards are worth their face value. If the total value goes over nine, the tens digit is dropped.

The player and dealer have rules that must be followed as to whether they are able to take a maximum of one more card or not. The rules are dependent upon the total of the first two cards being held by the player(s) or the dealer and for the dealer, the third card drawn by the player(s). One set of rules is outlined in Table 2 below.

TABLE 2

Baccarat Rules for Drawing Third Card

| Action | Initial Count of Own Hand | Third Card Drawn by Player |
|---|---|---|
| Player Draws | 0-5 | |
| Player Stands | 6-9 | |
| Dealer | 0-2 | 0-9 |
| Draws* | 3 | 0-7, 9 |
| | 4 | 2-7 |
| | 5 | 4-7 |
| | 6 | 6-7 |

*Dealer does not draw third card if situation is not shown.

In baccarat, up to only two players are dealt a hand along with the banker's (or dealer's) hand; all bettors including the players bet on whether either players' hands or both beat the banker's hand. The payoff for betting correctly is 1:1 plus a 5% commission paid to the house for winning by betting on the banker. A bettor can also bet that the player(s) and the dealer will tie, and this result typically pays the player at 8:1. Because of the set rules for drawing a third card, the odds for winning by a player are thus fixed and therefore, baccarat is a game of chance, not one of skill. The typical odds of the banker or dealer winning are 1.06:1.

SUMMARY OF THE INVENTION

A need exists for wagering games where the player's skill does not become a factor that determines whether the player wins or not. Such wagering games should, however, maintain an added element of suspense and interest in playing the game. Because the element of skill is eliminated from these wagering games, such games increase player participation in these games and increase player satisfaction.

Another aspect of the present invention relates to games that can be played in a jurisdiction that prohibits gaming. One method by which this may be achieved is by eliminating the element of skill. More particularly, the player's participation in the game does to not influence the outcome of the game. By eliminating the player's skill in a game of skill and chance, the game may be played in a jurisdiction that prohibits gaming.

Another aspect of the present invention relates to a system for conducting a game of chance. Such a system may operate within a legal jurisdiction in terms of accepting and paying out wagers to players, but the system may allow a player to view and play games of chance outside of the legal jurisdiction while complying with the local gaming laws of the jurisdiction the player is located. For instance, a player may be permitted to subscribe to one or more games of chance in a casino, and these subscribed games are then played outside of the casino (e.g., on a computer over the Internet). Because the player's skill does not influence the outcome of the game, the game can be played and viewed outside of the legal jurisdiction.

Another aspect of the present invention relates to games of chance developed from games of skill and chance. Such games may be conducted, for example, by a system that operates within a legal jurisdiction, but allows players from other jurisdictions to play and view the games of chance. Such games may include, for example games of chance developed from games of skill and chances whose rules and game play are familiar to most players (e.g., blackjack, poker, etc.). Such games are beneficial in that players are more likely to play games with which they are familiar. Also, as discussed above, player participation may be increased if the player's skill is not a factor in the outcome of the game.

According to one aspect of the present invention, a game of chance is provided that is adapted from at least one game of skill and chance. The game of chance comprises a plurality of players, and a predetermined set of rules by which the plurality of players play the game of chance, wherein winners are automatically determined from the plurality of players. In one embodiment of the invention, one of the plurality of players is at least one of a dealer, the house, a gaming operator and a computer. In another embodiment of the invention, the winner is automatically chosen by the gaming operator. In another embodiment of the invention, payout to the winner is automatically made according to a predetermined payout table. In another embodiment of the invention, play of the game of chance is performed automatically by a computer. In another embodiment of the invention, at least one bet is made according to a predetermined set of rules.

In another embodiment of the invention, the at least one bet is made automatically on behalf of at least one of the plurality of players. In another embodiment of the invention, the at least one bet is made by a computer. In another embodiment of the invention, the at least one bet is a non-initial bet. In another embodiment of the invention, the at least one game of skill to and chance is a game having elements of skill and chance. In another embodiment of the invention, the element of skill is removed from the game. In another embodiment of the invention, the game having elements of skill and chance is poker. In another embodiment of the invention, the game having elements of skill and chance is five-card stud. In another embodiment of the invention, the game having elements of skill and chance is five-card draw. In another embodiment of the invention, the game having elements of skill and chance is blackjack. In another embodiment of the invention, the game having elements of skill and chance is dominoes. In another embodiment of the invention, the game having elements of skill and chance is backgammon.

In another embodiment of the invention, elements of skill are removed by prohibiting a player to affect playing choices made throughout play of the game. In another embodiment of the invention, the winner is chosen by a computer controlled by the gaming operator. In another embodiment of the invention, additional bets are made according to a set of betting rules after the initial bet level is determined by at least one of the plurality of players. In another embodiment of the invention, at least one of the plurality of players pays to play the game with at least one of money and loyalty points.

In another embodiment of the invention, the at least one of the plurality of players pays by at least one of a group comprising cash, debit or credit card, account credit or loyalty program credit. In another embodiment of the invention, at least one of the plurality of players is allowed to create a subscription to play multiple games. In another embodiment of the invention, the at least one of the plurality of players is allowed to automatically renew the subscription. In another embodiment of the invention, each of the plurality of players plays against a game operator.

In another embodiment of the invention, at least one of the plurality of players does not need to observe the game to play. In another embodiment of the invention, each of the plurality of players may observe play of the game. In another embodiment of the invention, each of the plurality of players may observe play of the game on at least one of a group comprising a television, a personal computer, a kiosk, a handheld device, a telephone having a display, and in-person. In another embodiment of the invention, there is at least one progressive jackpot associated with the game. In another embodiment of the invention, payout for winning the game is by at least one of a group comprising money, credit, merchandise or loyalty points. In another embodiment of the invention, payout for winning money is by at to least one of a group comprising cash, check, debit card, and account credit. In another embodiment of the invention, the payout for winning loyalty points is by at least one of loyalty program credit and account credit. In another embodiment of the invention, the game includes a plurality of game sessions, and wherein the plurality of game sessions run continually. In another embodiment of the invention, a gaming operator displays, to each of the plurality of players, at least one of a winning game and a winning player.

In another embodiment of the invention, the game is conducted using a computer system. In another embodiment of the invention, the computer system automatically notifies at least one of the plurality of players of a result of the game. In another embodiment of the invention, the computer system automatically notifies at least one of the plurality of players of their winnings. In another embodiment of the invention, the computer system notifies the at least one of the plurality of players by at least one of a group comprising a telephone, a pager, fax, mail, a television, a personal computer, a handheld device and a kiosk. In another embodiment of the invention, the computer system notifies the at least one of the plurality of players by at least one of a group comprising a telephone, a pager, fax, mail, a television, a personal computer, a handheld device and a kiosk. In another embodiment of the invention, at least one of the plurality of players may access his or her results for past games. In another embodiment of the invention, the at least one of the plurality of players may access his or her results for past games from a location remote to the computer system. In another embodiment of the invention, the results for past games include at least one of a group including wins, payouts, and losses. In another embodiment of the invention, the at least one player gains access through at least one of a kiosk, a phone, a handheld device, a television and a computer. In another embodiment of the invention, at least one of the plurality of players is permitted to replay at least one past game. In another embodiment of the invention, the at least one player gains remote access through at least one of a kiosk, a telephone having a display, a handheld device, a television and a computer. In another embodiment of the invention, a plurality of game sessions associated with the game run continually. In another embodiment of the invention, one or more advertising streams are displayed to at least one of the plurality of players during the game. In another embodiment of the invention, a plurality of advertising streams are displayed between at least two of the plurality of game sessions. In another embodiment of the invention, at least one of the plurality of players is allowed to enter a game through an alternative method of entry (AMOE).

According to another aspect of the present invention, a method is provided for to conducting a game of chance adapted from at least one game of skill and chance. The method comprises acts of providing entry of a plurality of players in the game of chance, providing a predetermined set of rules by which the plurality of players play the game of chance, and automatically determining a winner from the plurality of players. In one embodiment of the invention, one of the plurality of players is at least one of a dealer, the house, a gaming operator and a computer. In another embodiment of the invention, the act of automatically determining a winner further comprises an act of automatically determining, by a gaming operator, winners among the plurality of players. In another embodiment of the invention, the method further comprises an act of automatically determining a payout to the winner according to a predetermined payout table. In another embodiment of the invention, the method of conducting the game of chance is performed automatically by a computer.

In another embodiment of the invention, the method further comprises an act of making at least one bet according to a predetermined set of rules. In another embodiment of the invention, the method further comprises an act of making the at least one bet automatically on behalf of at least one of the plurality of players. In another embodiment of the invention, the at least one bet is made by a computer. In another embodiment of the invention, the at least one bet is a non-initial bet. In another embodiment of the invention, the at least one game of skill and chance is a game having elements of skill and chance. In another embodiment of the invention, the method further comprises an act of removing the element of skill from the game. In another embodiment of the invention, the game having elements of skill and chance is poker. In another embodiment of the invention, the game having elements of skill and chance is five-card stud. In another embodiment of the invention, the game having elements of skill and chance is five-card draw. In another embodiment of the invention, the game having elements of skill and chance is blackjack. In another embodiment of the invention, the game having elements of skill and chance is dominoes. In another embodiment of the invention, the game having elements of skill and chance is backgammon. In another embodiment of the invention, the act of removing elements of skill comprises an act of prohibiting a player to affect playing choices made throughout play of the game.

In another embodiment of the invention, the act of choosing the winner is performed by a computer controlled by the gaming operator. In another embodiment of the invention, the method further comprises an act of making additional bets according to a set of betting rules after an initial bet level is determined by at least one of the plurality of players. In another embodiment of the invention, the method further comprises an act of permitting at least one of to the plurality of players to pay to play the game with at least one of money or loyalty points. In another embodiment of the invention, the method further comprises an act of permitting at least one of the plurality of players to pay by at least one of a group comprising cash, debit or credit card, account credit or loyalty program credit. In another embodiment of the invention, the method further comprises an act of permitting at least one of the plurality of players to create a subscription to play multiple games. In another embodiment of the invention, the method further comprises an act of permitting the at least one of the plurality of players to automatically renew the subscription. In another embodiment of the invention, each of the plurality of players plays against a game operator. In another embodiment of the invention, at least one of the plurality of players does not need to observe the game to play. In another embodiment of the invention, each of the plurality of players may observe play of the game. In another embodiment of the invention, each of the plurality of players may observe play of the game on at least one of a group including a television, a personal computer, a kiosk, a handheld device, a telephone having a display, and in-person.

In another embodiment of the invention, the method further comprises an act of associating at least one progressive jackpot with the game. In another embodiment of the invention, payout for winning the game may be by at least one of a group comprising money, credit, merchandise or loyalty points. In another embodiment of the invention, payout for winning money is by at least one of a group comprising cash, check, debit card, and account credit. In another embodiment of the invention, the payout for winning loyalty points is by at least one of loyalty program credit and account credit. In another embodiment of the invention, the game includes a plurality of game sessions, and wherein the method further comprises an act of running the plurality of game sessions continually. In another embodiment of the invention, the method further comprises an act of displaying, to each of the plurality of players, at least one of a winning game and a winning player.

In another embodiment of the invention, the game is conducted using a computer system. In another embodiment of the invention, the computer system performs an act of automatically notifying at least one of the plurality of players of a result of the game. In another embodiment of the invention, the computer system performs an act of automatically notifying at least one of the plurality of players of their winnings. In another embodiment of the invention, the computer system performs an act of notifying the at least one of the plurality of players by at least one of a group comprising a telephone, a pager, fax, mail, a television, a to personal computer, a handheld device and a kiosk. In another embodiment of the invention, the computer system performs an act of notifying the at least one of the plurality of players by at least one of a group comprising a telephone, a pager, fax, mail, a television, a personal computer, a handheld device and a kiosk. In another embodiment of the invention, the method further comprises an act of permitting at least one of the plurality of players to access his or her results for past games. In another embodiment of the invention, the method further comprises an act of permitting the at least one of the plurality of players to access his or her results for past games from a location remote to the computer system. In another embodiment of the invention, the results for past games include at least one of a group including wins, payouts, and losses.

In another embodiment of the invention, the at least one player gains access through at least one of a kiosk, a phone, a handheld device, a television and a computer. In another embodiment of the invention, at least one of the plurality of players is permitted to replay at least one past game. In another embodiment of the invention, the at least one player gains remote access through at least one of a kiosk, a telephone having a display, a handheld device, a television and a computer. In another embodiment of the invention, a plurality of game sessions associated with the game run continually. In another embodiment of the invention, one or more advertising streams are displayed to at least one of the plurality of players during the game. In another embodiment of the invention, one or more advertising streams are displayed between at least two of the plurality of game sessions. In another embodiment of the invention, at least one of the plurality of players is allowed to enter a game through an alternative method of entry (AMOE).

According to another aspect of the present invention, a computer-readable medium is provided having computer-readable signals stored thereon that define instructions that, as a result of being executed by a computer, instruct the computer to perform a method for conducting a game of chance adapted from at least one game of skill and chance. The method comprises acts of providing entry of a plurality of players in the game of chance, providing a predetermined set of rules by which the plurality of players play the game of chance, and automatically determining a winner from the plurality of players. In another embodiment of the invention, one of the plurality of players is at least one of a dealer, the house, a gaming operator and a computer. In another embodiment of the invention, the act of automatically determining a winner further comprises an act of automatically determining, by a gaming operator, winners among the plurality of players. In another embodiment of the invention, the to method further comprises an act of automatically determining a payout to the winner according to a predetermined payout table. In another embodiment of the invention, the method of conducting the game of chance is performed automatically by a computer. In another embodiment of the invention, the method further comprises an act of making at least one bet according to a predetermined set of rules. In another embodiment of the invention, the method further comprises an act of making the at least one bet automatically on behalf of at least one of the plurality of players. In another embodiment of the invention, the at least one bet is made by a computer. In another embodiment of the invention, the at least one bet is a non-initial bet.

In another embodiment of the invention, the at least one game of skill and chance is a game having elements of skill and chance. In another embodiment of the invention, the method further comprises an act of removing the element of skill from the game. In another embodiment of the invention, the game having elements of skill and chance is poker. In another embodiment of the invention, the game having elements of skill and chance is five-card stud. In another embodiment of the invention, the game having elements of skill and chance is five-card draw. In another embodiment of the invention, the game having elements of skill and chance is blackjack. In another embodiment of the invention, the game having elements of skill and chance is dominoes. In another embodiment of the invention, the game having elements of skill and chance is backgammon. In another embodiment of the invention, the act of removing elements of skill comprises an act of prohibiting a player to affect playing choices made throughout play of the game. In another embodiment of the invention, the act of choosing the winner is performed by a computer controlled by the gaming operator. In another embodiment of the invention, the method further comprises an act of making additional bets according to a set of betting rules after an initial bet level is determined by at least one of the plurality of players. In another embodiment of the invention, the method further comprises an act of permitting at least one of the plurality of players to pay to play the game with at least one of money or loyalty points. In another embodiment of the invention, the method further comprises an act of permitting at least one of the plurality of players to pay by at least one of a group comprising cash, debit or credit card, account credit or loyalty program credit. In another embodiment of the invention, the method further comprises an act of permitting at least one of the plurality of players to create a subscription to play multiple games. In another embodiment of the invention, the method further comprises an act of permitting the at least one of the plurality of players to automatically renew the subscription. In another embodiment of the invention, each of the plurality of players plays against a game operator.

In another embodiment of the invention, at least one of the plurality of players does not need to observe the game to play.

In another embodiment of the invention, each of the plurality of players may observe play of the game. In another embodiment of the invention, each of the plurality of players may observe play of the game on at least one of a group including a television, a personal computer, a kiosk, a handheld device, a telephone having a display, and in-person. In another embodiment of the invention, the method further comprises an act of associating at least one progressive jackpot with the game. In another embodiment of the invention, payout for winning the game may be by at least one of a group comprising money, credit, merchandise or loyalty points. In another embodiment of the invention, payout for winning money is by at least one of a group comprising cash, check, debit card, and account credit. In another embodiment of the invention, the payout for winning loyalty points is by at least one of loyalty program credit and account credit. In another embodiment of the invention, the game includes a plurality of game sessions, and wherein the method further comprises an act of running the plurality of game sessions continually. In another embodiment of the invention, the method further comprises an act of displaying, to each of the plurality of players, at least one of a winning game and a winning player.

In another embodiment of the invention, the game is conducted using a computer system. In another embodiment of the invention, the computer system performs an act of automatically notifying at least one of the plurality of players of a result of the game. In another embodiment of the invention, the computer system performs an act of automatically notifying at least one of the plurality of players of their winnings. In another embodiment of the invention, the computer system performs an act of notifying the at least one of the plurality of players by at least one of a group comprising a telephone, a pager, fax, mail, a television, a personal computer, a handheld device and a kiosk. In another embodiment of the invention, the computer system performs an act of notifying the at least one of the plurality of players by at least one of a group comprising a telephone, a pager, fax, mail, a television, a personal computer, a handheld device and a kiosk. In another embodiment of the invention, the method further comprises an act of permitting at least one of the plurality of players to access his or her results for past games. In another embodiment of the invention, the method further comprises an act of permitting the at least one of the plurality of players to access his or her results for past games from a location remote to the computer system. In another embodiment of the invention, the results for past games include at least one of a group including wins, payouts, and losses. In another embodiment of the invention, the at least one player gains access to through at least one of a kiosk, a phone, a handheld device, a television and a computer.

In another embodiment of the invention, at least one of the plurality of players is permitted to replay at least one past game. In another embodiment of the invention, the at least one player gains remote access through at least one of a kiosk, a telephone having a display, a handheld device, a television and a computer. In another embodiment of the invention, a plurality of game sessions associated with the game run continually. In another embodiment of the invention, one or more advertising streams are displayed to at least one of the plurality of players during the game. In another embodiment of the invention, one or more advertising streams are displayed between at least two of the plurality of game sessions. In another embodiment of the invention, at least one of the plurality of players is allowed to enter a game through an alternative method of entry (AMOE).

According to another aspect of the present invention, a system is provided for playing a game of chance adapted from at least one game of skill and chance. The system comprises means for providing entry of a plurality of players in the game of chance, means for providing a predetermined set of rules by which the plurality of players play the game of chance, and means for automatically determining a winner from the plurality of players. According to one embodiment of the invention, one of the plurality of players is at least one of a dealer, the house, a gaming operator and a computer. According to another embodiment of the invention, the means for automatically determining a winner further comprises means for automatically determining, by a gaming operator, winners among the plurality of players. According to another embodiment of the invention, the system further comprises means for automatically determining a payout to the winner according to a predetermined payout table. According to another embodiment of the invention, the game of chance is conducted by a computer. According to another embodiment of the invention, the system further comprises means for making at least one bet according to a predetermined set of rules. According to another embodiment of the invention, the system further comprises means for making the at least one bet automatically on behalf of at least one of the plurality of players. According to another embodiment of the invention, the at least one bet is made by a computer. According to another embodiment of the invention, the at least one bet is a non-initial bet.

According to another embodiment of the invention, the at least one game of skill and chance is a game having elements of skill and chance. According to another embodiment of the invention, the system further comprises means for removing the element of skill from the game. According to another embodiment of the invention, the game having elements of skill to and chance is poker. According to another embodiment of the invention, the game having elements of skill and chance is five-card stud. According to another embodiment of the invention, the game having elements of skill and chance is five-card draw. According to another embodiment of the invention, the game having elements of skill and chance is blackjack. According to another embodiment of the invention, the game having elements of skill and chance is dominoes. According to another embodiment of the invention, the game having elements of skill and chance is backgammon. According to another embodiment of the invention, the means for removing elements of skill comprises means for prohibiting a player to affect playing choices made throughout play of the game. According to another embodiment of the invention, the means for choosing the winner is performed by a computer controlled by the gaming operator. According to another embodiment of the invention, the system further comprises means for making additional bets according to a set of betting rules after an initial bet level is determined by at least one of the plurality of players.

According to another embodiment of the invention, means for providing entry and means for automatically determining a winner are substantially located in a jurisdiction that permits wagering games of chance. According to another embodiment of the invention, means for providing entry includes means for entering at least one of the plurality of players in the game of chance at a gaming establishment.

According to another embodiment of the invention, the system further comprises means for remotely playing, by at least one of the plurality of players, the game of chance. According to another embodiment of the invention, means for remotely playing includes means for replaying at least a portion of a previously-played game. According to another embodiment of the invention, means for remotely playing further comprises means for indicating to the at least one of the plurality of players information relating to a previously-played game. According to one embodiment of the invention, means for remotely playing further comprises means for viewing, by the at least one of the plurality of players, the game of chance substantially at the same time that the game of chance is played. According to another embodiment of the invention, the means for remotely playing does not impact an outcome of conducting the game of chance. According to another embodiment of the invention, means for providing entry further comprises means for entering at least one of the plurality of players in a plurality of games, at least one of the plurality of games is played outside of a legal jurisdiction in which the game of chance is conducted. According to one embodiment of the invention, the system further comprises means for viewing, by the at least one of the plurality of players, the game of to chance outside of the legal jurisdiction in which the game of chance is conducted.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

In the drawings,

FIG. 3 is a flow chart showing a process for playing a game according to one embodiment of the invention;

DETAILED DESCRIPTION OF THE INVENTION

Figure 1:
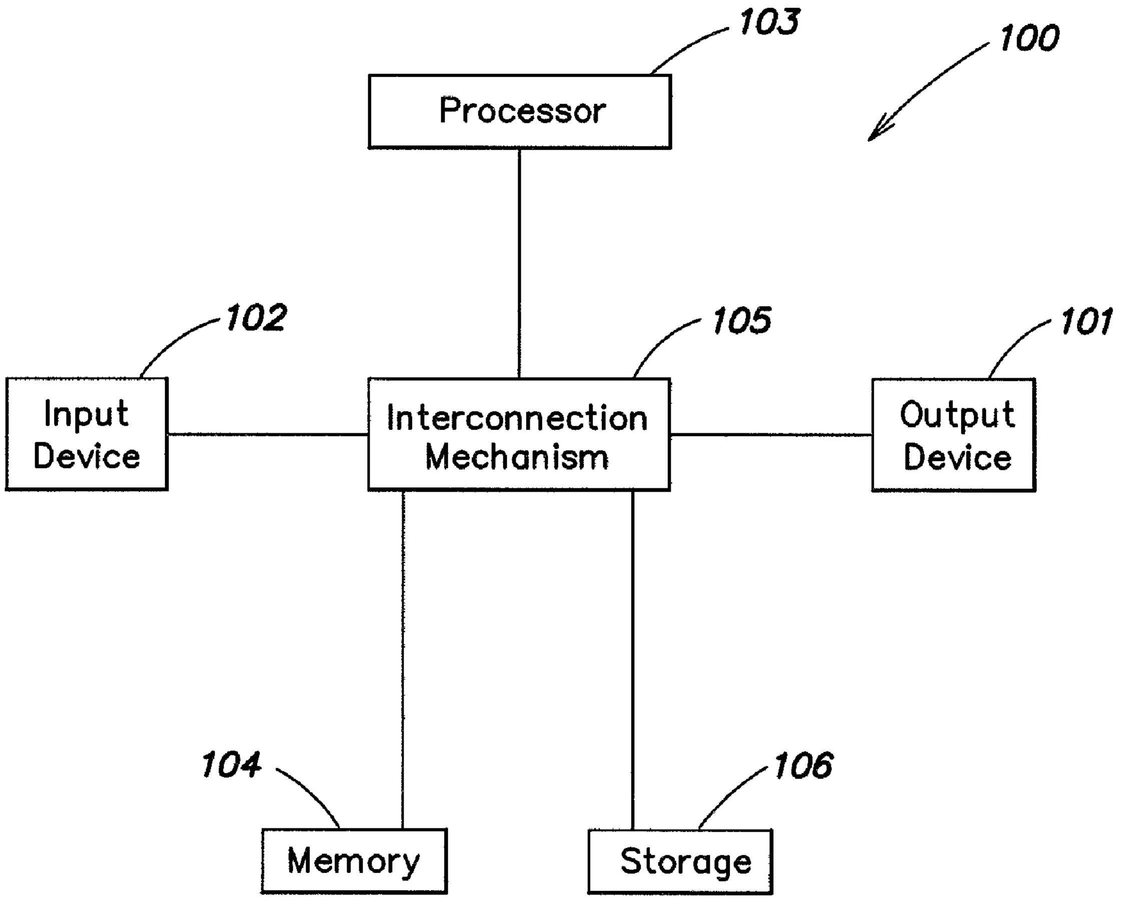
FIG. 1 is an illustrative embodiment of a general-purpose computer system upon which games according to various aspects of the invention may be implemented.

According to one aspect of the invention, wagering games of chance are provided that are adapted from traditional wagering games of skill and chance, such as blackjack, poker or dominoes, such that skill needed from a player is removed. In accordance with one aspect, the need for player skill may be removed by allowing a gaming device or computer to automatically play the game following a predetermined set of rules. By doing so, the game to becomes a wagering game of chance.

An important criterion for games that involve skill is the requirement for a player decision to be made following the initial bet and/or card or game play. For instance, in backgammon, a player rolls two dice and must decide which chips to move and how to move them following rules of moving. In five-card draw poker, a player must decide which cards to keep and which to discard in return for getting new cards. In dominoes, a player must decide which tile to play and where. All of these requirements for a decision lead to a requirement of skill or knowledge to improve the player's chance of winning.

Unfortunately, most casinos and gaming operators greatly discourage a player from using strategy sheets and card counting. As a result, the casual player does not have all the advantages of a professional player because the time (and, most importantly, the additional skill) required to memorize the strategies may be great compared to the potential reward. Furthermore, prior to memorizing the optimal card playing strategy, the player must know the rules of the particular gaming operator so that the right strategy is memorized. Additionally, game play may drastically slow down for a casual player using a strategy if the player has not practiced much in advance. These difficulties lead to decreased participation in some type of games by casual players.

According to one aspect of the invention, it is realized that one method for resolving the need for a player to remember an ideal card playing strategy is to provide wagering game rules that automatically determine game play. As discussed above, baccarat employs rules making the game of baccarat a pure game of chance. The advantage of baccarat is that the odds, payout and commission are fixed, the card play is pre-determined and the game proceeds quickly. Unfortunately, the disadvantages of baccarat are the payout, commission and odds lead to a bettor in most instances not being able to obtain a large winning over a number of games; the card play rules are complicated; and the card play has few options to allow suspense to enter into the game. Because of these reasons, baccarat is not a popular game.

According to various embodiments of the invention, games that ordinarily involve skill of a player are converted to games of chance. These games may be, for example, blackjack, poker, dominoes and other games of skill and chance. By eliminating skill involved in playing the game, the game becomes more accessible to others who are unfamiliar with the rules, and the game play becomes faster, as decision components by the player are removed. Also, because more popular traditional games of skill and chance may be used to create a game of chance, people already familiar with such games would more likely play. According to one to embodiment of the invention, a game is provided that has fixed odds of winning created by following a set of rules for playing the game. These rules allow for the automatic play by, for example, a computer. Optionally, the computer may be adapted to perform betting on the game on behalf of a player. According to another embodiment of the invention, the games are traditional games of skill and chance that are converted to games of chance. These games may also be automatically played and/or betted by computer on behalf of a player. As discussed, such games may be played in a legal manner outside of a legal jurisdiction (e.g., in a casino) if the player's skill is removed from impacting the odds of winning.

Prior to a game, a game player may need to pay for playing. For example, a game player may pay using money or loyalty points. In particular, a game player may pay using money by debit card, credit card, check, cash or from an account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels or frequent visitor programs for casinos. The game player may pay in person (e.g., by using a cashier in a casino) or through other remote means including telephone, handheld device, kiosk, computer through the Internet or other network and mail. Payment may be in any form that is legal in the particular jurisdiction. Also, rather than a player paying a set amount per game, a player may instead open an account and place money or loyalty points in the account as credit.

In one embodiment of the invention, players may subscribe to play in multiple game sessions. That is, the player pays at one time to play more than one game. These games may be consecutive games, periodically disbursed over a period of time, or other distribution. According to one embodiment, a player may subscribe to play multiple games using a computer-based interface (e.g., a personal computer, cell phone, PDA, set-top box or other interface). These subscribed games may be automatically played (e.g., by a computer system) without the need to interact with the game provider. According to another embodiment, the player may also choose to have his or her subscription automatically renewed. The player may also be able to manage his or her subscription including setting spending limits, time-out periods or password protection.

According to one embodiment of the invention, a player may subscribe to a number of games to be played in the future in a place where wagering games are legal (e.g., in a casino or to jurisdiction where wagering is permitted), and may observe and/or play these subscribed games in another location (e.g., on a computer coupled to the Internet, on a cellular phone, PDA, or other system). In this manner, the gaming experience may be extended beyond the legal jurisdiction. It is realized, however, that some jurisdictions require that the gaming activity be located within the jurisdiction, and therefore, one aspect of the present invention relates to locating the system responsible for accepting subscriptions from and making payments to players within a legal jurisdiction. Further, according to one embodiment, games of chance are provided that are developed from games of skill and chance, and therefore the player through his/her remote play does not influence the outcome of the game. Therefore, because the system is located in a legal jurisdiction, and the player does not influence the outcome of the game outside of the legal jurisdiction, the wagering activity may be performed legally. Further, the gaming experience is improved as familiar games of skill and chance are provided in a form that may be played from a remote location.

According to one embodiment of the invention, players may also enter to play this or any other wagering game of chance using an alternative method of entry (AMOE). AMOE is a required available method of entry that does not require a purchase to enter a sweepstake; sweepstakes are usually used as a promotional or marketing tool. An individual entering a sweepstakes by AMOE is required by law to have the same odds of winning each of the available prizes.

A common AMOE method is to have an individual interested in entering the sweepstakes send in a postcard having his or her name, address or other contact information. Another AMOE method includes having an individual sign on to a free Internet website and submit the required information without payment of a fee. Numerous other methods may be used for AMOE. Most sweepstakes limit the number of times one individual or family may enter a sweepstakes by AMOE.

According to one embodiment of the invention, it is realized that an AMOE (alternative method of entry) may be used to enter a game of chance. More particularly, it is possible to develop, implement and run wagering games of chance, including the inventive games described herein, with an AMOE method of entry. AMOE methods are conventionally used to enter a player in a sweepstakes, which is not considered wagering or gambling. Thus, according to one embodiment of the invention, an individual may enter a wagering game of chance by AMOE using, for example, the postcard or the online method outlined above. The to wagering game of chance player entering by AMOE may also have the same odds to win the payout associated with the game in which they are entered. The wagering game of chance player entering by AMOE may also be limited to enter in a small number of games within a given period of time. For example, the AMOE entry may be limited to entry in one game in a period of one year, two games in one month, etc. Other numbers of sessions and given periods may be any number, and the invention is not limited to any particular implementation.

According to one embodiment, the game which the game player enters by AMOE may be determined by the game player on an AMOE entry form. For example, a postcard AMOE may be required to state the date and the time of the game that the game player wants to enter. Alternatively, the game entered by the player may be the next starting game after the AMOE entry form is received and logged. As another alternative, AMOE entries may be assigned to a specific game(s) each hour, day, week or other time interval.

According to one embodiment, a game also has a predetermined payout table associated with it. The payout table may include a listing of the possible methods of obtaining a payout and their payout ratios. The payout ratio is the payout amount in relation to the amount wagered. For instance, if the payout ratio is 1.2:1, then a winning $1.00 bet has a payout of $1.20. The payout amount for each method of winning may depend upon (but may not be rigidly determined by) the odds of obtaining the particular way to obtain a winning outcome. In one embodiment, the payout table may follow a standard payout schedule for playing the original wagering game of skill and chance. However, because the odds for winning are lowered for the gaming operator in this invention, the payout ratios may be adjusted for each method of winning.

The payout table may also be affected if the game is played against the gaming operator or against other players. Typically, if the player is playing against the gaming operator, then the payout table with the payout ratio discussed above may be used. However, if the player is playing against other players, then the payout may be determined by the total amount bet from all the players minus a predetermined commission paid to the gaming operator.

A payout table may also include adjustments for a player's subscription. For instance, the payout may be adjusted according to the player's subscription level. For example, the payout ratio may increase or the gaming operator commission may decrease if the player has a multiple game subscription, multiple card subscription, high payment per game card or any combination of the three. The payout may also be adjusted for numerous other criterion including frequent player credits. Of course, all payout adjustments must meet any legal requirements for the gaming jurisdiction in which the game is played.

A payout table for each game may also be supplemented by a jackpot that transfers from game session to game session. These types of jackpots are commonly referred to as rolling or progressive jackpots. A rolling jackpot may be, for example, the same amount that transfers from game to game until it is paid out. A progressive jackpot is a rolling jackpot that increases as more game sessions are played or may be increased according to some other criterion. Rolling or progressive jackpots are typically paid out for a difficult way to win. For example, a rolling jackpot may be paid to a player that obtains a royal flush in a poker game, as it is realized that the odds of obtaining a royal flush are very small.

The final payout may also be affected by bonus play, which is well-known in the gaming industry. Bonus play generally works to increase some payouts by offering the chance to multiply a payout.

Once a player has paid or entered to play a game, the player may place an opening bet or the computer may place the bet for the player, if the player is placing a set bet per game. After the opening bet is placed, the game is played according to the rules of the game being played. Once the game is started, the game play (and optionally the betting) are partially or fully automated using one or more computer systems. Examples of such computer systems are more fully described below.

When a computer or gaming device plays a game automatically, the computer may determine the play according to rules predetermined for the game. For instance, these rules may be available for players to see in advance. Preferably, the computer or gaming device determines the best play according to the rules for best play according to experts in the game. For example, the best strategy for playing blackjack may be found at www.blackjackinfo.com. However, it should be appreciated that any strategy may be used, and the invention is not limited to any particular strategy.

The website referenced above first requests the game variation, i.e., number of decks, soft or hard seventeen, and doubling and surrender options, and from that information generates tables for the best strategy for splitting pairs, doubling, hitting and standing. An example of part of the predetermined rules for game play for a variation of blackjack is shown in Table 1. The predetermined rules may also take into account the card count for determining whether a particular play will improve a player's odds of winning. Similar resources may be used for other wagering games of skill and chance to determine a predetermined set of rules for playing these other games. It should be appreciated that the invention is not limited to any particular game, but rather, any game of skill and chance may be used to develop a game of chance that uses a set of predetermined rules for playing the game.

With blackjack and other games, the computer may also automatically bet for the player after the initial ante. In blackjack, the only possible additional bets in blackjack are determined by the initial ante. These bets are split, double, insurance, and surrender. In traditional poker, the bets are typically more freeform but if the computer plays and bets the game for a player, then the predetermined rules may also include rules that determine how the computer will bet in particular situations. Table 1 also shows how the rules for additional betting for blackjack may be incorporated.

The game player may view the game proceedings using television, wireless or line telephone with display, handheld device, kiosk, computer, or in person. Depending upon the viewing medium, it may be necessary to download game information prior to viewing while other viewing medium may allow viewing of the streamed game information. For example, the game player may operate a computer that has an Internet-enabled interface (e.g., using Macromedia Flash or Java programming methods) and the computer may display streamed game information within that interface. The game player may also decide not to watch. However, according to one embodiment of the invention, the player need not view the game session to win the game.

The computer system may automatically determine when a player is a winner. Such a result may be automatically authenticated and verified by the computer system. In this instance, the computer system may then notify the game player that he or she has won and the winnings after the computer has consulted the predetermined payout table described above. The notification of winning to a game player may occur by mail, e-mail, computer web or network, telephone, television, pager, fax, kiosk or any other method.

When the computer system automatically determines the winner and play is against other players, the computer system may also determine the game(s), hand(s) or board(s) and the associated player identity(ies) that hold the best chance of winning or is the best at the moment during game play. The computer system may then display the game(s), hand(s) or board(s) or the identity of the game player(s) that is the best to all game players observing the game session. The computer system may also selectively display only one or a subset of all the best games, hand(s) or board(s) or the associated player identity(ies) to a particular game to player observing the game session. Additionally when the game is completed, the computer system may display the winning game, hand or board, the winning player's identity or the payout.

During the period of time between the games, a game operator may make announcements, rest, or perform any number of actions. If the game is played using a computer system, advertisements, sponsorships, public service announcements or any visual or auditory content may be inserted, for example, into one or more of these periods of time. Advertisements or other content may also be inserted into the game display during a game session.

If the computer automatically plays the games for the players, a game player may access information regarding results of a game remotely after the game is completed. In this manner, a player need not attend or view a particular game session, as the results of each session may be accessed at a later time. Further, the player need not access the game session results from the same interface at which the game was played or subscribed. Remote access may be gained, for example, by kiosk, telephone, television, computer, handheld device or any other device or system that is appropriate. Information that may be accessed about a past game session may include, for example, whether the player won or lost, what the player's payout was or any other information relating to the past game session.

A game player may also be able to replay or review a past game session using a video-enabled device. For instance, a kiosk, a telephone having a display, a television, a computer or handheld device may be used to replay a past game session. By accessing a selected game session in the computer system, a game player may be able to see a past game as it occurred, the winning game and winning game player identity(ies) or possibly any other aspect of the game of interest.

Preferably, according to one embodiment of the invention, game play and betting are partially or fully automated using one or more computer systems. In another embodiment of the invention, game play and betting are fully automated. A computer system may be a single computer capable of executing one or more functions of a game. For instance, the computer may be a supercomputer, minicomputer or a mainframe or personal computer. A computer system used to run a game and its associated sessions may also include any combination of computer system types that cooperate to accomplish system-level tasks. Multiple computer systems may also be used to run a game. The computer system also may include one or more input or output devices, displays, or storage units.

A computer system that executes a game according to various embodiments of the invention may include, for example, three system components. One system component may handle payment, subscription and/or AMOE by players to enter the game sessions. Another system component may perform functions relating to playing and viewing the game and the third system component may perform functions relating to performing payouts. Such a game system may also be coupled (e.g., by direct line or network) to other computer systems including systems for handling casino or hotel loyalty programs, reservations, in-room television viewing, gambling floor kiosks, or other systems. Connections to other computer systems may be performed using one or more of the system components described below.

A payment component may include one or many of a number of well-known systems. For example, a player may be able to pay to play one or more games using a telephone and speaking with a call center representative who inputs player, payment and subscription information manually into a computer using a user interface. In the computer, player, payment and subscription information may be stored in a data structure stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interfaces (GUI), a display screen, a mouse, a keyboard, a keypad, a track ball, a microphone (e.g., to be used in conjunction with a voice recognition system), a speaker, a touch screen, a game controller (e.g., a joystick) etc, and any combinations thereof.

Player information may also be entered into a payment system component. Player information that may be input includes name, address, telephone number and age. Payment information may also include credit or debit card number or loyalty account information. Also, as discussed above, various aspects of the invention relate to subscription gaming for wagering games of chance. Subscription information may be input including, for example, a first game session date and time, number of game sessions to be played, number of game pieces per game session and bet per game piece. Based upon the payment and subscription information, the call center representative may verify that the payment information is valid and enough credit or funds are available for the player's desired subscription.

A similar system may exist for players entering using the mail or a postcard AMOE except the call center may be replaced by a mail center with representatives entering information into a data structure using a user interface. For example, a cashier that works at a casino with players to pay cash to play, may also have the ability to input player, account and subscription information using a user interface of a computer system.

Computer systems or pay engines for handling electronic or online payment and subscriptions may also be used. Such systems are well-known and include such systems as Paypal, iKobo, Verisign, and other systems. Using such a system, a player interacts directly with a user interface to input information into a payment data structure that may be transferred to one or more payment systems (e.g., Paypal).

Various pay systems and one or more user interfaces may be located on computer systems coupled by a network, with the computer system(s) storing data including player, account and subscription information. As used herein, a "network" or a "communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

The above are merely an illustrative embodiment of a pay system component. Such an illustrative embodiment is not intended to limit the scope of the invention, as any of numerous other implementations of the pay system, for example, variations of online payment, are possible and are intended to fall within the scope of the invention. For example, the payment system may include using pay-per-view systems associated with interactive television or the pay engine may additionally deliver a receipt to the player by either e-mail or mail. None of the claims set forth below are intended to be limited to any particular implementation of the pay system unless such claim includes a limitation explicitly reciting a particular implementation.

Payout systems are also well-known. Any of a number of standard systems or payout engines for making payouts for winning may be used. For example, a standard application programming interface such as 'Quicken' (Intuit Inc., Mountain View, Calif., USA) may be used to write and mail checks or credit a debit card, credit card (if legal in the jurisdiction of play) or loyalty account. 'Quicken' may obtain the payout information by accessing a payout data structure across a network. As used herein, an "application programming interface" or to "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of the pay system unless such claim includes a limitation explicitly reciting a particular implementation.

A game playing and viewing system according to one embodiment of the invention may comprise a number of components for performing specific functions. The components may include, for example, storage systems or devices that store data structures having information relating to game configuration and game play. For example, such information may include game variation information, present game information, game session history and win history. A game playing and viewing system may also include components used to access payment and payout data structures.

Although the systems and methods described below are described primarily in relation to playing blackjack, it should be appreciated that various aspects of the invention described herein are not limited thereto, but may be applied to other wagering games. For example, systems may be provided to play such games as poker, dominoes or backgammon.

Figure 3A:
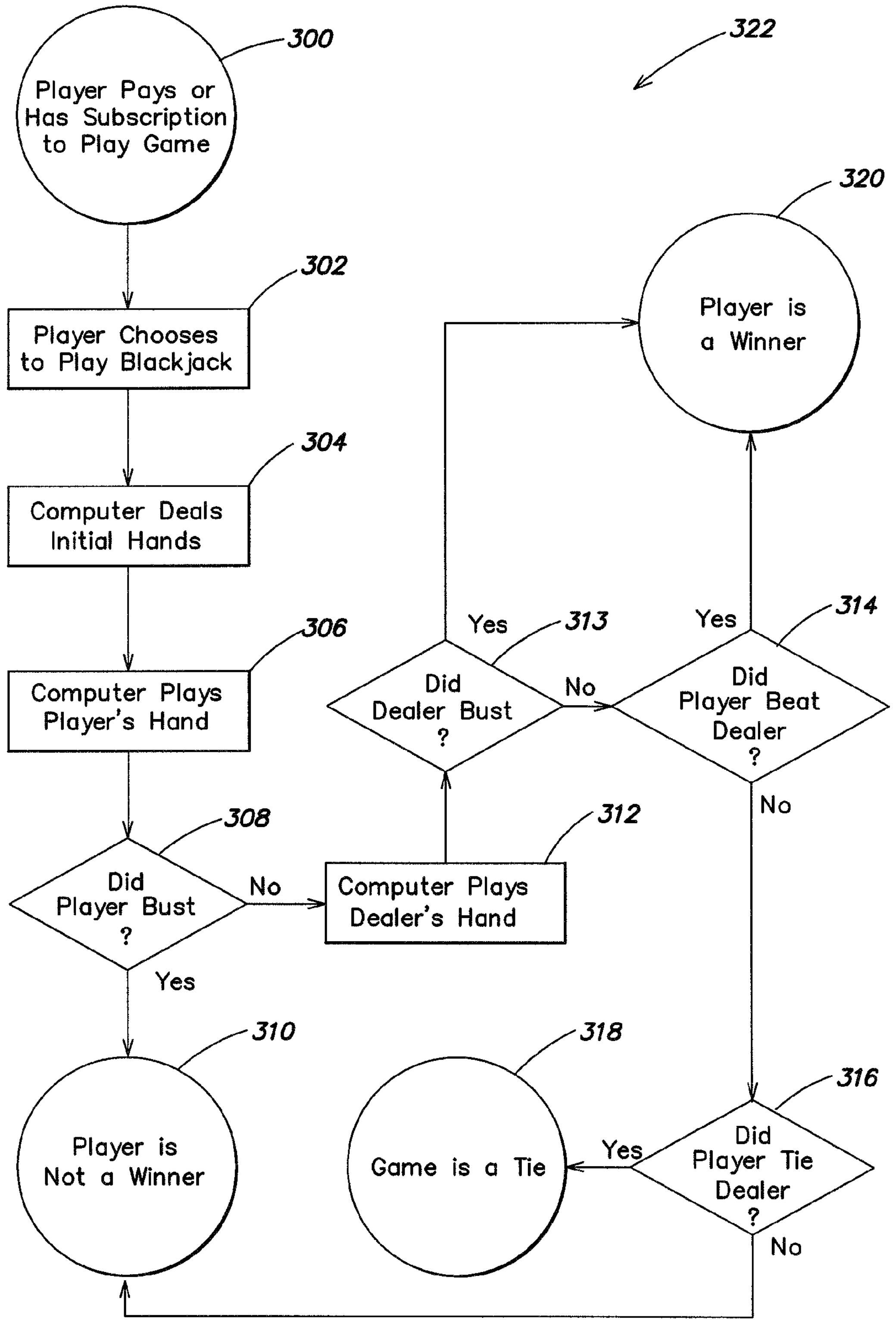
FIG. 3*a* shows functions a game engine may perform according to a one embodiment of the disclosure.

A game playing and viewing system may also include a game engine. A game engine according to one embodiment of the invention may perform functions according to a process 322 as shown in FIG. 3*a*. As shown in FIG. 3*a*, a game session may proceed as such for a player that has chosen to play blackjack without a surrender option.

At step 300, the player pays, enters or subscribes to play a game and at step 302 decides to play blackjack without a surrender option as discussed above. After accessing the game variations data structure to pull up payout table and game play, game and/or betting rules, the system may then deal initial hands to the player and the dealer at step 304. In the case of blackjack, two cards are dealt face up to the player and one card is dealt face up and one card is to dealt face down to the dealer. At step 306, the system proceeds to play (and optionally bet) the player's hand.

Figure 3B:
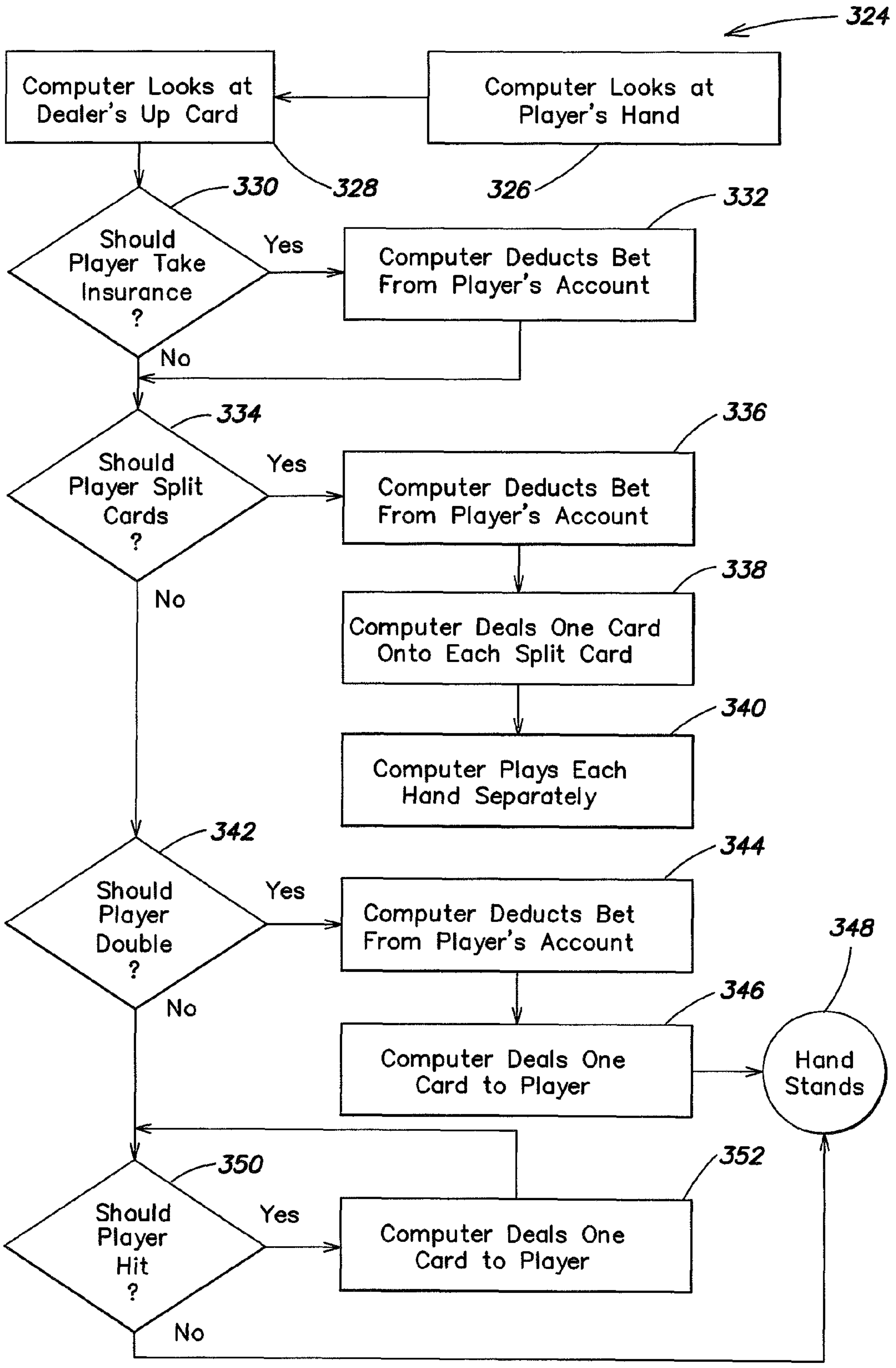
FIG. 3*b* illustrates steps that may be performed by a system to play a player's hand pursuant to one embodiment of the disclosure.
Figure 4:
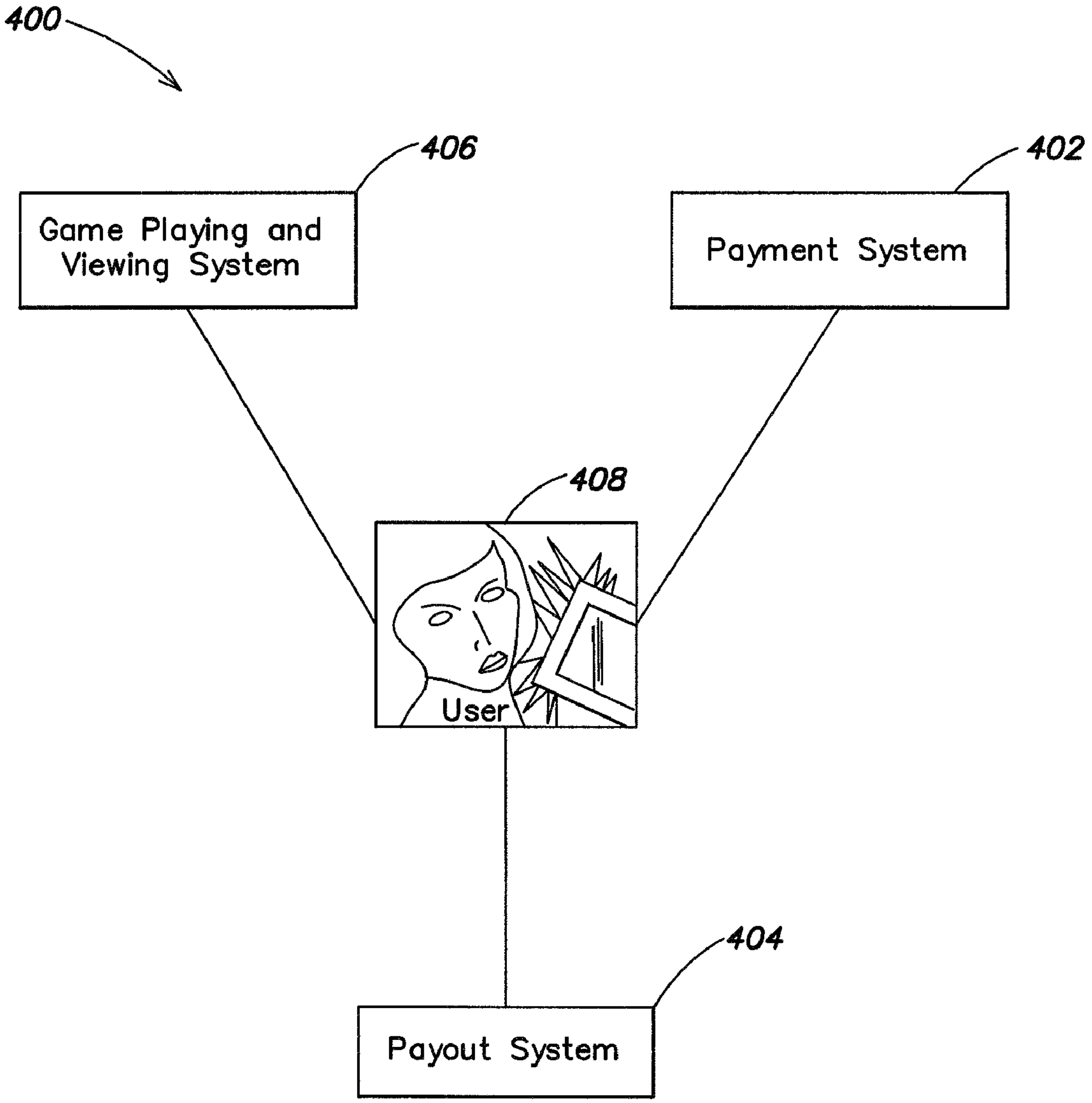
FIG. 4 is a block diagram showing components of a game computer system according to one embodiment of the invention.
Figure 5:
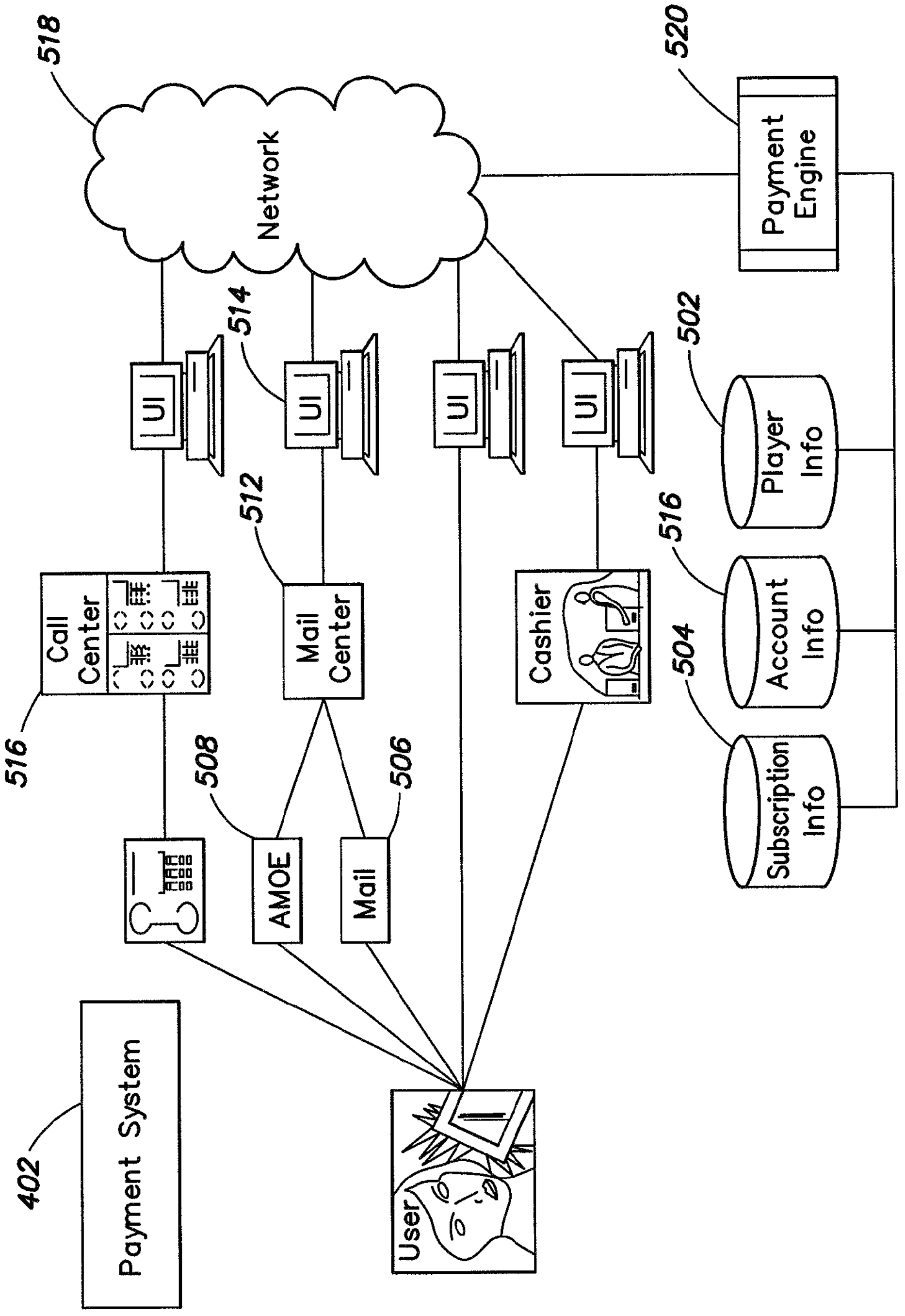
FIG. 5 is a block diagram showing components of a game payment subsystem according to one embodiment of the invention.
Figure 6:
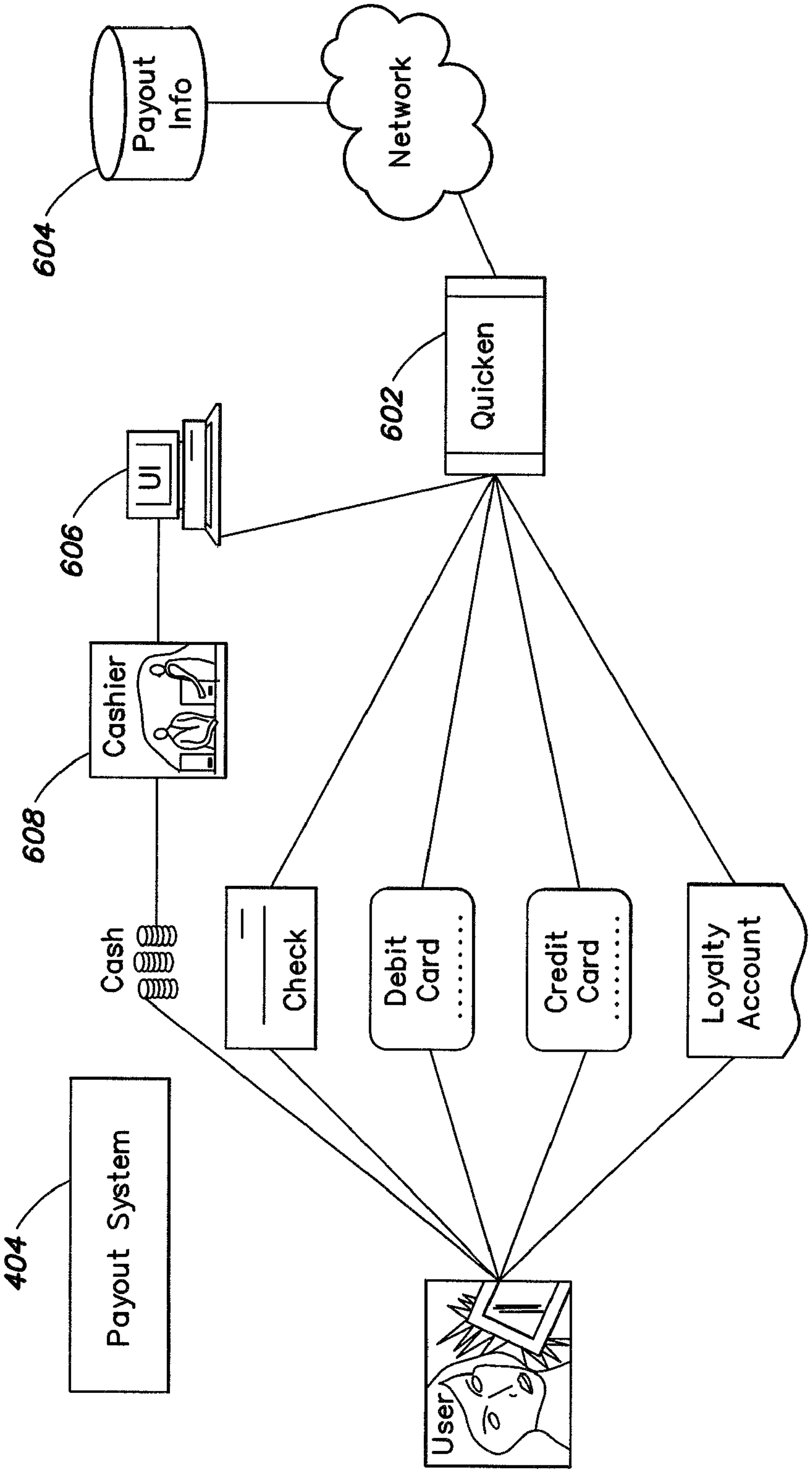
FIG. 6 is a block diagram showing components of a game payout subsystem according to one embodiment of the invention.
Figure 7:
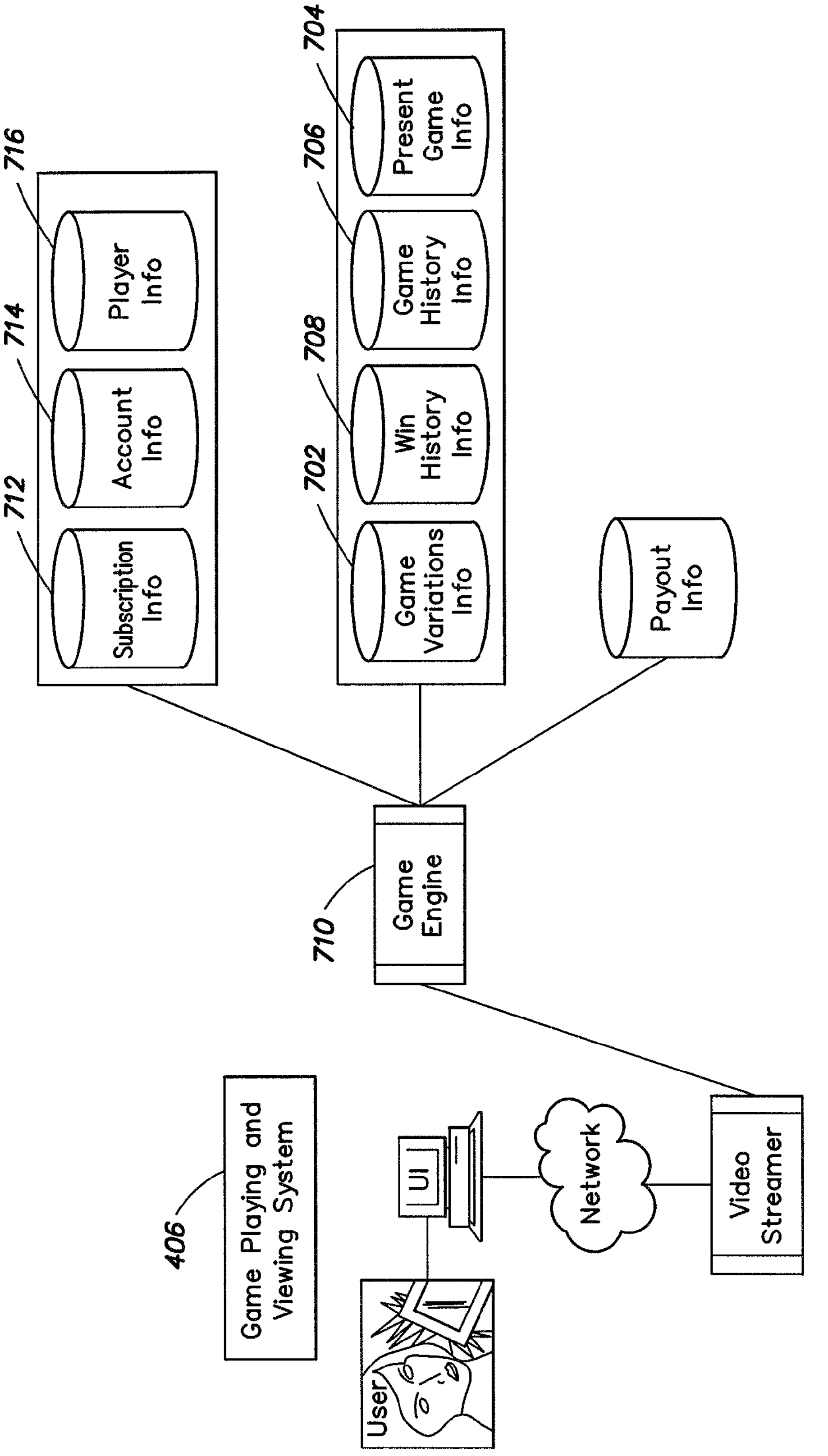
FIG. 7 is an illustrative embodiment of the major basic components of a game playing and viewing subsystem according to one embodiment of the invention.

For instance, FIG. 3*b* further illustrates steps that may be performed by a system to play a player's hand. According to one embodiment, the system plays the hand according to predetermined game play rules after reviewing the player's cards and the dealer's up card. The system then proceeds through the play options of and if appropriate play and betting for insurance, splitting cards, doubling or hitting according to the predetermined rules. A hand that performs none of the mentioned options stands. Similar steps, e.g., steps 332, 336 and 344 that involve a deduction of an additional bet from a player's account, may be performed using the same program procedure. Step 340 may have the each of the two separate hands after splitting proceed through the steps shown in process 324 shown with more particularly in FIG. 3*b*.

Step 306 described in detail as process 324 is an illustrative embodiment of a system (e.g., a computer system) that plays a player's hand. Such an illustrative embodiment is not intended to limit the scope of the invention, as any of numerous other implementations of the steps a system employs to play a player's hand are possible and are intended to fall within the scope of the invention. For example, the order of steps 330, 334, 343 and 350 may be different or the decision to split, double, hit or stand may be made at one time. Further, the game may be a different type of game having different rules of play. None of the claims set forth below are intended to be limited to any particular implementation of the computer playing a player's hand unless such claim includes a limitation explicitly reciting a particular implementation.

After playing the player's hand, the system then determines if the player's hand busted (exceeds twenty one points) at step 308. If the hand does not bust, then the system may play the dealer's hand at step 312 following the rules of the blackjack variation being played. After playing the dealer's hand, the system may then determine and indicate whether the player won (320), tied (318) or lost (310). If the player won, then the system may proceed to notify the player that he or she is a winner as well as possibly determine the payout and notify the player also of such.

The system may also display the winning hand and/or player information to all game players. Winning player information that may be displayed may include name, city, state and country and/or any other identifying information. It may also be possible that winners or winning hands may be selectively displayed to one or more game players. For instance, if numerous winners occur at one time, a player in Bismarck, N. Dak. may be shown only to the winning player information or hand that occurs geographically close to him or her, say in Pierre, S. Dak. versus some other location (e.g., Boston, Mass.).

If the player ties the dealer, then the system may return the player's bet, congratulate the player, thank the player for playing, invite the player to play again or any number of actions. Notification may occur, for example, in a user interface of the system. If the hand lost or busted, then the player is not a winner and the system retains the player's bet. The system may also notify the player that the hand is not a winner, thank the player for playing or invite the player to play again or any number of actions through one or more user interfaces.

Game play process 322 may also include additional acts, and process 322 is not limited to the acts. Further, the order of the acts performed as part of process 322 is not limited to the order illustrated in FIG. 3*a* as the acts may be performed in other orders, and one or more of the acts of process 322 may be performed in series or in parallel to one or more other acts, or parts thereof. For example, acts 308 and 313, or parts thereof, may be performed in parallel.

Process 322 is merely an illustrative embodiment of the method of game play for a game engine. Such an illustrative embodiment is not intended to limit the scope of the invention, as any of numerous other implementations of the method of game play for a game engine. Variations of process 322 are possible and are intended to fall within the scope of the invention. For example, the system may request the player's approval prior to deducting a bet from a player's account. None of the claims set forth below are intended to be limited to any particular implementation of the method of game play for a game engine, unless such claim includes a limitation explicitly reciting a particular implementation.

Process 322, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described below in relation to FIG. 1, that perform the functions described above with respect to describe or reference the method can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite or wireless medium to a user interface. If the game is played completely automatically, the user interface may be merely a video terminal including television with no user input means. Viewing access may be controlled by standard means for conditional access including using set top box addresses, telephone numbers or Internet protocol (IP) addresses. Other hardware and/or software may be used for playing and/or viewing game sessions, and the invention is not limited to any particular implementation.

The above is merely an illustrative embodiment of a game playing and viewing system. Such an illustrative embodiment is not intended to limit the scope of the invention, as any of numerous other implementations of a game playing and viewing system, for example, variations of playing and viewing game sessions, are possible and are intended to fall within the scope of the invention. None of the claims set forth below are intended to be limited to any particular implementation of a game playing and viewing system unless such claim includes a limitation explicitly reciting a particular implementation.

System 400, and components thereof such as the payment, payout and game engines, may be implemented using software (e.g., C, C#, C++, Java, or a combination thereof), hardware (e.g., one or more application-specific integrated circuits), firmware (e.g., electrically-programmed memory) or any combination thereof. One or more of the components of 400 may reside on a single system (e.g., the payment subsystem component), or one or more components may reside on separate, discrete systems. Further, each component may be distributed across multiple systems, and one or more of the systems may be interconnected.

Further, on each of the one or more systems that include one or more components of 400, each of the components may reside in one or more locations on the system. For example, different portions of the components of 400 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 400 may be implemented on a computer system described below in relation to FIGS. 1 and 2.

System 400 is merely an illustrative embodiment of the game system. Such an illustrative embodiment is not intended to limit the scope of the invention, as any of numerous other implementations of the game system, for example, variations of 400, are possible and are intended to fall within the scope of the invention. For example, a parallel system for viewing by interactive television may add additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, game play and betting, determining winners and paying winners. It should be appreciated that the system may perform other functions, including network to communication, and the invention is not limited to having any particular function or set of functions.

For example, various aspects of the invention may be implemented as specialized software executing in a general-purpose computer system 100 such as that shown in FIG. 1. The computer system 100 may include a processor 103 connected to one or more memory devices 104, such as a disk drive, memory, or other device for storing data. Memory 104 is typically used for storing programs and data during operation of the computer system 100. Components of computer system 100 may be coupled by an interconnection mechanism 105, which may include one or more busses (e.g., between components that are integrated within a same machine) and/or a network (e.g., between components that reside on separate discrete machines). The interconnection mechanism 105 enables communications (e.g., data, instructions) to be exchanged between system components of system 100. Computer system 100 also includes one or more input devices 102, for example, a keyboard, mouse, trackball, microphone, touch screen, and one or more output devices 101, for example, a printing device, display screen, speaker. In addition, computer system 100 may contain one or more interfaces (not shown) that connect computer system 100 to a communication network (in addition or as an alternative to the interconnection mechanism 105.

Figure 2:
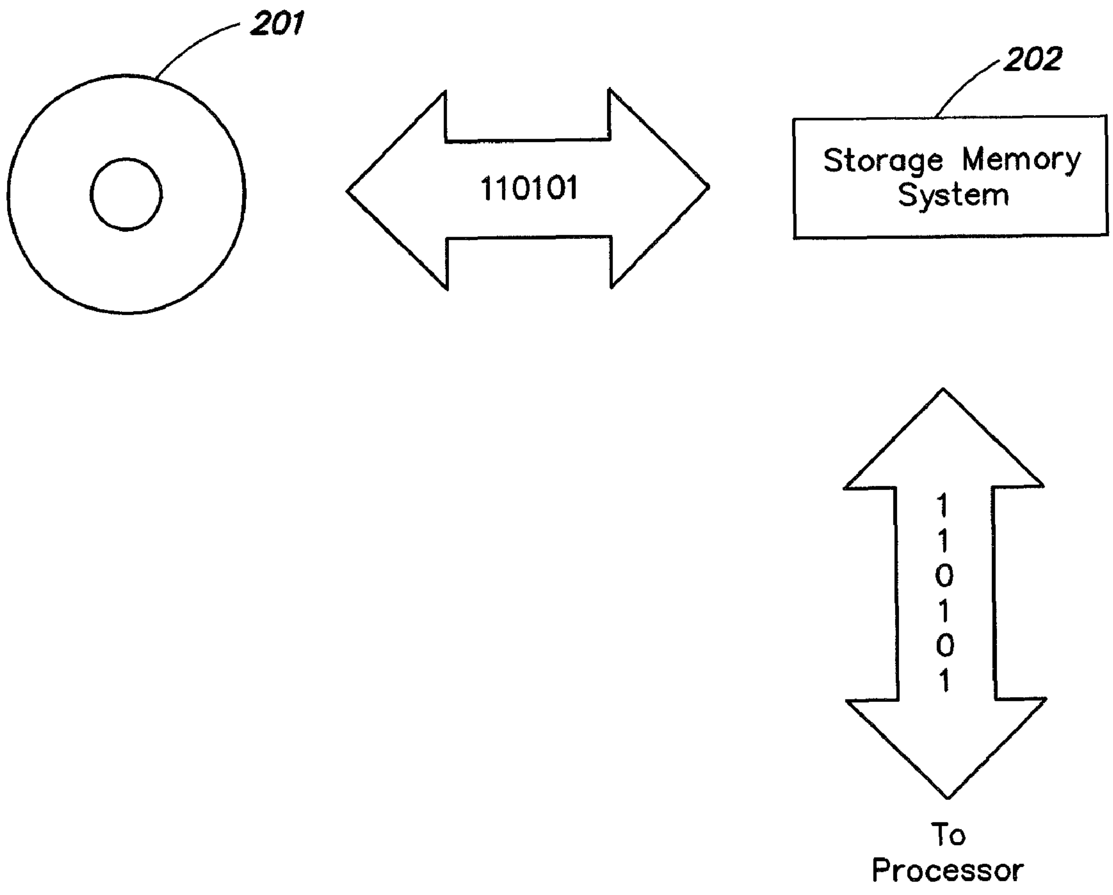
FIG. 2 is an illustrative embodiment of a computer data storage system that may be used to implement various aspects of the invention.

The storage system 106, shown in greater detail in FIG. 2, typically includes a computer readable and writeable nonvolatile recording medium 201 in which signals are stored that define a program to be executed by the processor or information stored on or in the medium 201 to be processed by the program. The medium may, for example, be a disk or flash memory. Typically, in operation, the processor causes data to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM). It may be located in storage system 106, as shown, or in memory system 104, not shown. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is not limited to a particular memory system 104 or storage system 106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components that that shown in FIG. 1.

Computer system 100 may be a general-purpose computer system that is programmable using a high-level computer programming language. Computer system 100 may be also implemented using specially programmed, special purpose hardware. In computer system 100, processor 103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms “comprising”, “including”, “carrying”, “having”, “containing”, “involving”, and the like are to be understood to be open-ended, i.e., to mean including but not limited to. Only the transitional phrases “consisting” of and “consisting essentially of” respectively, shall be closed to or semi-closed transitional phrases, as set forth, with respect to claims, in the United States Patent Office Manual of Patent Examining Procedures (Original Eighth Edition, August 2001), Section 2111.03.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for conducting a game of chance adapted from at least one game of skill and chance, the method comprising acts of:

- providing, via a processor, entry of a plurality of players in the game of chance wherein the game of chance has been converted from a game of skill or a game of skill and chance by removing an element of skill from the game so as to prohibit any of the plurality of players from affecting play choices made during game play;
- providing, via a processor, a predetermined set of rules by which the plurality of players play the game of chance; and
- automatically determining, via a processor, at least one winner from the plurality of players.

2. The method according to claim 1, wherein one of the plurality of players is at least one of a dealer, the house, a gaming operator and a computer.

3. The method according to claim 1, wherein the act of automatically determining at least one winner further comprises an act of automatically determining, by a gaming operator, at least one winner from among the plurality of players.

4. The method according to claim 3, wherein the act of choosing the at least one winner is performed by a computer controlled by the gaming operator.

5. The method according to claim 1, further comprising an act of automatically determining a payout to the at least one winner according to a predetermined payout table.

6. The method according to claim 1, wherein the method of conducting the game of chance is performed automatically by a computer.

7. The method according to claim 1, further comprising an act of making at least one bet according to a predetermined set of rules.

8. The method according to claim 7, further comprising an act of making the at least one bet automatically on behalf of at least one of the plurality of players.

9. The method according to claim 8, wherein the at least one bet is made by a computer.

10. The method according to claim 8, wherein the at least one bet is a non-initial bet.

11. The method according to claim 1, wherein the at least one game of skill and chance is a game having elements of skill and chance.

12. The method according to claim 11, wherein the game having elements of skill and chance is poker.

13. The method according to claim 12, wherein the game having elements of skill and chance is five-card stud.

14. The method according to claim 12, wherein the game having elements of skill and chance is five-card draw.

15. The method according to claim 12, wherein the game having elements of skill and chance is blackjack.

16. The method according to claim 11, wherein the game having elements of skill and chance is dominoes.

17. The method according to claim 11, wherein the game having elements of skill and chance is backgammon.

18. The method according to claim 1, further comprising an act of making additional bets according to a set of betting rules after an initial bet level is determined by at least one of the plurality of players.

* * * * *